US012643113B2

(12) United States Patent
Sekino et al.

(10) Patent No.: US 12,643,113 B2
(45) Date of Patent: Jun. 2, 2026

(54) METHOD OF DETERMINING APERTURE AREA AND DROPLET JET DEVICE

(71) Applicant: SEIKO EPSON CORPORATION, Tokyo (JP)

(72) Inventors: Hirokazu Sekino, Chino (JP); Shoichi Takasuna, Shiojiri (JP); Yasunori Onishi, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 539 days.

(21) Appl. No.: 17/972,628

(22) Filed: Oct. 25, 2022

(65) Prior Publication Data

US 2023/0128457 A1 Apr. 27, 2023

(30) Foreign Application Priority Data

Oct. 26, 2021 (JP) ................................ 2021-174418

(51) Int. Cl.
*B05B 1/02* (2006.01)
*B05B 1/08* (2006.01)

(52) U.S. Cl.
CPC . *B05B 1/08* (2013.01); *B05B 1/02* (2013.01)

(58) Field of Classification Search
CPC .... B05B 1/02; B05B 1/08; B05B 1/26; B05B 12/00-40; A61B 17/3203; A61B 2017/32032; A61B 2017/32035
USPC ............................................ 239/589.1, 600
See application file for complete search history.

(56) References Cited

U.S. PATENT DOCUMENTS

| | | | |
|---|---|---|---|
| 2009/0017423 A1 | 1/2009 | Gottenbos et al. | |
| 2021/0031223 A1 | 2/2021 | Saito et al. | |
| 2021/0256178 A1* | 8/2021 | Zhu | B05B 3/02 |

FOREIGN PATENT DOCUMENTS

| | | | |
|---|---|---|---|
| CN | 112297627 A | 2/2021 | |
| JP | 2007-518487 A | 7/2007 | |
| JP | 2021-023366 A | 2/2021 | |
| WO | 2016-013256 A1 | 1/2016 | |

* cited by examiner

*Primary Examiner* — Arthur O. Hall
*Assistant Examiner* — Juan C Barrera
(74) *Attorney, Agent, or Firm* — Harness, Dickey & Pierce, P.L.C.

(57) ABSTRACT

A method of determining an aperture area of a nozzle hole in a droplet jet device including a flow channel through which a liquid flows and the nozzle hole configured to spray the liquid, the method including determining the aperture area [$m^2$] of the nozzle hole so that a jet flow of the liquid sprayed from the nozzle hole is fragmented into droplets, the liquid having a value of $\rho^{0.45}/\sigma$ determined from a density [$kg/m^3$] of the liquid and a surface tension [N/m] of the liquid in a range no lower than 300 and no higher than 900, and a kinematic viscosity coefficient [$m^2/s$] of the liquid in a range no lower than 1.0E-6 and no higher than 2.0E-5.

2 Claims, 4 Drawing Sheets

METHOD OF DETERMINING APERTURE AREA AND DROPLET JET DEVICE

The present application is based on, and claims priority from JP Application Serial Number 2021-174418, filed Oct. 26, 2021, the disclosure of which is hereby incorporated by reference herein in its entirety.

BACKGROUND

1. Technical Field

The present disclosure relates to a method of determining an aperture area and a droplet jet device.

2. Related Art

In the past, there have been used a variety of types of droplet jet devices for spraying a liquid in a droplet state such as cleaning equipment or cosmetic equipment. In, for example, JP-T-2007-518487 (the term "JP-T" as used herein means a published Japanese translation of a PCT patent application), there is disclosed a fluid drop system which has a supply source of a fluid, a fluid drop generator for generating a stream of individual fluid droplets from the fluid, and a member for deciding a direction of the stream of the fluid droplets, and which performs cleaning of teeth with the fluid droplets having speed in a predetermined range, sizes in a predetermined range, and a frequency in a predetermined range.

In the droplet jet device for spraying the liquid in the droplet state, when being used in, for example, the cleaning equipment or the cosmetic equipment, there is performed crushing an object, cleaning a skin, teeth, or the like of a human, or the like by making the droplets collide with the object, or the skin, the teeth, or the like of the human. In such a case, it becomes necessary for the liquid to be sprayed as droplets with high rectilinearity from a jet nozzle of the droplet jet device. However, in the related-art droplet jet device, the aperture area of the nozzle hole for spraying the liquid fails to have an appropriate size, and thus, the liquid fails to be sprayed in a preferable droplet state in some cases.

SUMMARY

In view of the above problems, a method of determining an aperture area according to the present disclosure is a method of determining an aperture area of a nozzle hole in a droplet jet device provided with a flow channel through which a liquid flows and the nozzle hole configured to spray the liquid, the method including determining the aperture area S [$m^2$] of the nozzle hole so that a jet flow of the liquid sprayed from the nozzle hole is fragmented into droplets using a liquid having a value of $\rho^{0.45}/\sigma$ determined from a density $\rho$ [$kg/m^3$] of the liquid and a surface tension $\sigma$ [N/m] of the liquid in a range no lower than 300 and no higher than 900, and a kinematic viscosity coefficient $\nu$ [$m^2/s$] in a range no lower than 1.0E-6 and no higher than 2.0E-5 as the liquid.

Further, in view of the problems described above, a droplet jet device according to the present disclosure is a droplet jet device including a flow channel through which a liquid flows, and a nozzle hole configured to spray the liquid, wherein a liquid having a value of $\rho^{0.45}/\sigma$ determined from a density $\rho$ [$kg/m^3$] of the liquid and a surface tension $\sigma$ [N/m] of the liquid in a range no lower than 300 and no higher than 900, and a kinematic viscosity coefficient $\nu$ [$m^2/s$] in a range no lower than 1.0E-6 and no higher than 2.0E-5 is used as the liquid, and an aperture area S [$m^2$] of the nozzle hole fulfills $S>(-1356.5\nu^2+0.09908\nu)\times Q$ when the droplet jet device sprays the liquid at Q [L/min] as a jet flow rate.

DESCRIPTION OF AN EXEMPLARY EMBODIMENT

Figure 1:
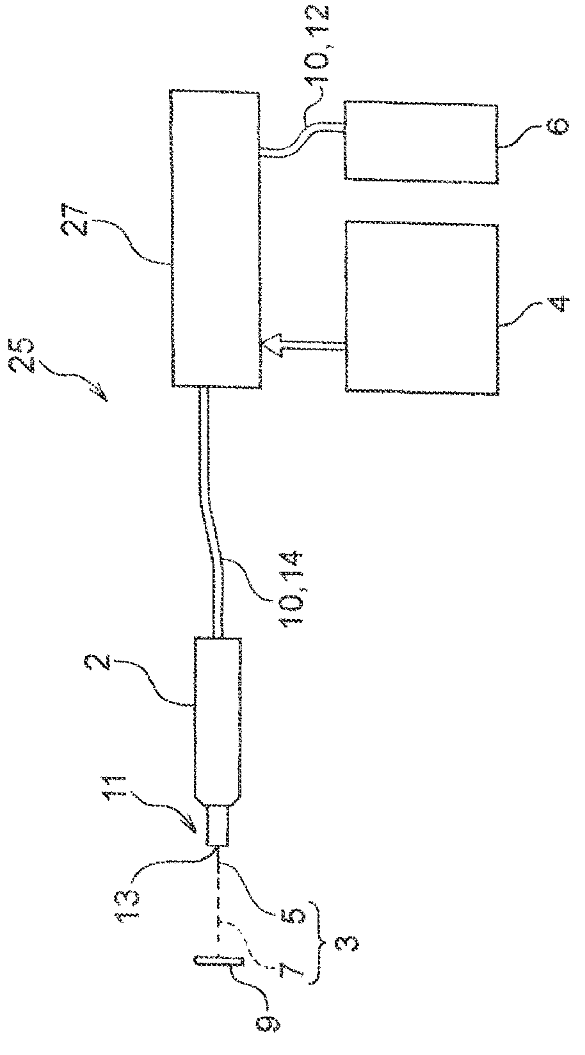
FIG. 1 is an overall schematic configuration diagram of a droplet jet device according to an embodiment of the present disclosure.

First, the present disclosure will hereinafter be described schematically.

In order to solve the problems described above, a method of determining the aperture area in a first aspect according to the present disclosure is a method of determining the aperture area of a nozzle hole in the droplet jet device provided with a flow channel through which a liquid flows and the nozzle hole for spraying the liquid, and is characterized in that there is used the liquid having a value of $\rho^{0.45}/\sigma$ determined from a density $\rho$ [$kg/m^3$] of the liquid and a surface tension $\sigma$ [N/m] of the liquid in a range no lower than 300 and no higher than 900, and a kinematic viscosity coefficient $\nu$ [$m^2/s$] in a range no lower than 1.0E-6 and no higher than 2.0E-5, and the aperture area S [$m^2$] of the nozzle hole is determined so that the jet flow of the liquid sprayed from the nozzle hole is fragmented into droplets.

According to the present aspect, there is used the liquid having the value of $\rho^{0.45}/\sigma$ determined from the density $\rho$ [$kg/m^3$] of the liquid and the surface tension $\sigma$ [N/m] of the liquid in the range no lower than 300 and no higher than 900, and the kinematic viscosity coefficient $\nu$ [$m^2/s$] in a range no lower than 1.0E-6 and no higher than 2.0E-5, and the aperture area S [$m^2$] of the nozzle hole is determined so that the jet flow of the liquid sprayed from the nozzle hole is fragmented into the droplets. In other words, the aperture area S is determined taking the fact that the jet flow of the liquid sprayed from the nozzle hole is fragmented into the droplets as an indispensable condition. Therefore, by fragmenting the jet flow into the droplets, it is possible to spray the liquid in the preferable droplet condition.

The method of determining the aperture area in a second aspect is characterized in that in the droplet jet device, a Reynolds number Re of a continuous flow of the liquid flowing through the nozzle hole is set no higher than 2300, and a jet number Je of the liquid to be sprayed from the nozzle hole is set no lower than 0.1 and no higher than 400 in the first aspect.

Although it is preferable for the continuous flow of the liquid flowing through the nozzle hole to be a laminar flow, a tendency that the continuous flow becomes a turbulent flow instead of the laminar flow increases when the Reynolds number Re exceeds 2300. Further, although it is preferable for the droplets to be jetted in a smooth flow region or a wavy flow region, when the jet number Je is lower than 0.1, a tendency that the droplet becomes in a dropping region instead of the smooth flow region or the wavy flow region increases, and when the jet number Je exceeds 400, a tendency that the droplet becomes in a spray flow region instead of the smooth flow region or the wavy flow region increases. However, according to the present aspect, the Reynolds number Re of the continuous flow of the liquid flowing through the nozzle hole is set no higher than 2300, and the jet number Je of the liquid to be sprayed from the nozzle hole is set no lower than 0.1 and no higher than 400. Therefore, it is possible to realize the laminar flow as the continuous flow of the liquid flowing through the nozzle hole, and at the same time, it is possible to jet the droplets in the smooth flow region or the wavy flow region. Therefore, it is possible to spray the liquid in a particularly preferable droplet condition.

The method of determining the aperture area in a third aspect is characterized in that $S>(-1356.5\nu^2+0.09908\nu)\times Q$ is fulfilled when the droplet jet device performs the spray at the jet flow rate Q [L/min] of the liquid in the first or second aspect.

According to the present aspect, when spraying the liquid at Q [L/min], $S>(-1356.5\nu^2+0.09908\nu)\times Q$ is fulfilled. As a result of a keen investigation by the inventors, it has been figured out that it is possible to spray the liquid in the particularly preferable droplet state by determining the aperture area S so as to fulfill $S>(-1356.5\nu^2+0.09908\nu)\times Q$ when spraying the liquid at Q [L/min].

The droplet jet device in a fourth aspect is a droplet jet device provided with a flow channel through which a liquid flows and the nozzle hole for spraying the liquid, and is characterized in that there is used the liquid having a value of $\rho^{0.45}/\sigma$ determined from a density ρ [kg/m$^3$] of the liquid and a surface tension σ [N/m] of the liquid in a range no lower than 300 and no higher than 900, and a kinematic viscosity coefficient ν [m$^2$/s] in a range no lower than 1.0E-6 and no higher than 2.0E-5, and the aperture area S [m$^2$] of the nozzle hole fulfills $S>(-1356.5\nu^2+0.09908\nu)\times Q$ when the droplet jet device performs the spray at Q [L/min] as the jet flow rate of the liquid.

According to the present aspect, when spraying the liquid at Q [L/min], $S>(-1356.5\nu^2+0.09908\times Q$ is fulfilled. As described above, it is possible to spray the liquid in the particularly preferable droplet state by adopting the aperture area S determined so as to fulfill $S>(-1356.5\nu^2+0.09908\times Q$ when spraying the liquid at Q [L/min].

The droplet jet device in a fifth aspect is characterized in that the Reynolds number Re of the continuous flow of the liquid flowing through the nozzle hole is set no higher than 2300, and the jet number Je of the liquid to be sprayed from the nozzle hole is set no lower than 0.1 and no higher than 400 in the fourth aspect.

According to the present aspect, the Reynolds number Re of the continuous flow of the liquid flowing through the nozzle hole is set no higher than 2300, and the jet number Je of the liquid to be sprayed from the nozzle hole is set no lower than 0.1 and no higher than 400. Therefore, it is possible to realize the laminar flow as the continuous flow of the liquid flowing through the nozzle hole, and at the same time, it is possible to jet the droplets in the smooth flow region or the wavy flow region, and it is possible to spray the liquid in the particularly preferable droplet state.

Embodiment of Droplet Jet Device

A droplet jet device 25 according to the embodiment of the present disclosure will hereinafter be described in detail based on FIG. 1. The droplet jet device 25 is a cleaning droplet jet device for a skin and so on suitable for cleaning of a skin of a face, an arm, a hand, a foot, a back, or the like, or teeth. It should be noted that it is obvious that the droplet jet device 25 is not limited to those for cleaning of a skin or teeth.

As shown in FIG. 1, the droplet jet device 25 according to the present embodiment is provided with a jet nozzle 11 having at least one nozzle hole 13 for spraying liquid 3, a pressurizing liquid supplier 27 for pressurizing the liquid 3 to feed the liquid 3 to the jet nozzle 11, and a controller 4 for controlling an operation of the pressurizing liquid supplier 27 to make the liquid 3 sprayed from the nozzle hole 13 fly toward an object 9 such as a skin in a state of being fragmented into droplets 7 from a continuous flow 5.

The droplet jet device 25 is provided with a spray unit 2 having the jet nozzle 11 for spraying the liquid 3, a liquid tank 6 for retaining the liquid 3 to be sprayed, a pump unit as the pressuring liquid supplier 27, a liquid suction tube 12 forming a flow channel 10 for the liquid 3 connecting the liquid tank 6 and the pressurizing liquid supplier 27 to each other, and a liquid sending tube 14 also forming the flow channel 10 connecting the pressurizing liquid supplier 27 and the spray unit 2 to each other. The pressurizing liquid supplier 27 is controlled by the controller 4 in a pump operation such as pressure of the liquid 3 sent to the spray unit 2 through the liquid sending tube 14. In other words, the supply pressure is controlled.

It should be noted that the droplet jet device 25 is capable of spraying the liquid 3 from the spray unit 2 in a variety of conditions due to the control by the controller 4. A preferable configuration example of the droplet jet device 25 will hereinafter be described.

Two Conditions for Stable Droplet Jet

First, as a premise, there will be described two conditions for stable droplet jet. As described in "Journal of Jet Flow Engineering" Vol. 13, No. 1 (1996) pp. 86-98 and so on, it has been known that an aspect of a liquid jet flow jetted from a single nozzle hole 13 can be classified as follows using a jet number Je.

1. Dropping Region ($Je<0.1$)
2. Smooth Flow Region ($0.1\leq Je<10$)
3. Wavy Flow Region ($10\leq Je\leq 400$)
4. Spray Flow Region ($400<Je$)

It has been known that it is necessary to spray the liquid 3 in the smooth flow region or the wavy flow region in order to stably form a droplet flow which is high in rectilinearity and small in variation in grain size from the liquid jet flow thus jetted. In other words, it is necessary to set parameters so as to fulfill $0.1\leq Je\leq 400$.

In particular, in a state of the continuous flow 5 of the liquid 3 to be sprayed from the spray unit 2, and a state of the subsequent transition to the formation into droplets, the viscosity or the kinematic viscosity coefficient, a surface tension, a density of the liquid 3 to be fed, and the nozzle hole diameter of the spray unit 2 affect homogeneity of the droplets 7 to be generated. Here, in order to generate the homogenous droplets 7, it is preferable to set the nozzle hole diameter which fulfills the Reynolds number Re and the jet number Je with which the spray of the continuous flow 5 does not spread but makes the transition to the droplets 7 with respect to a variety of liquids 3 different in physical property values from each other. The liquid 3 is sprayed from the spray unit 2 in a state of keeping the rectilinearity, and is then fragmented into the homogenous droplets 7. It should be noted that the droplets 7 thus fragmented fly in a state of substantially keeping the speed of the continuous flow 5 sprayed from the jet nozzle 11, the impact pressure which the droplets 7 can generate when colliding with the object 9 is in a range from several hundreds of kPa to several hundreds of MPa, and thus, it is possible for the droplets 7 thus fragmented to soften, crush, or remove the object 9 which the droplets 7 collide with.

Here, the Reynolds number Re is expressed as Formula (1) described below using a flow velocity V [m/s] of the liquid 3, a nozzle hole diameter D [m], and the kinematic viscosity coefficient ν [$m^2/s$] of the liquid 3.

$$Re = \frac{VD}{\nu} \tag{1}$$

Further, the jet number Je is expressed as Formula (2) described below further using the surface tension σ [N/m] of the liquid 3, the density ρ [$kg/m^3$] of the liquid 3, and a density ρa [$kg/m^3$] of air.

$$Je = \frac{\rho D V^2}{\sigma} \cdot \left(\frac{\rho_a}{\rho}\right)^{0.55} = \rho_a^{0.55} \cdot \frac{\rho^{0.45}}{\sigma} \cdot DV^2 \tag{2}$$

It is understood from Formula (1) and Formula (2) that the Reynolds number Re is apt to be affected by the kinematic viscosity coefficient ν, and the jet number Je is apt to be affected by the surface tension σ, respectively. Here, it is desired to suppress the Reynolds number Re to a value no higher than 2300 with which the turbulent flow component is difficult to occur in the continuous flow 5, and it is desired to suppress the jet number Je to a value no lower than 0.1 and no higher than 400 so that stable fragmentation of the droplets 7 can be realized. It should be noted here that $\rho a^{0.55}$ in the formula of the jet number Je is a constant taking a value of about 1.1 irrespective of the liquid 3 to be sprayed.

In contrast, $\rho^{0.45}/\sigma$ is a constant which differs by the liquid 3 to be sprayed, but is decided by the liquid 3, and which is in a range no lower than about 300 and no higher than about 900 with respect to the liquids 3 as shown in Table 1 described below. Further, the kinematic viscosity coefficient ν [$m^2/s$] is in the range from about 1.0E-06 [$m^2/s$] to about 2.0E-05 [$m^2/s$].

TABLE 1

| LIQUID | SURFACE TENSION σ [mN/m] | DENSITY ρ [$kg/m^3$] | KINEMATIC VISCOSITY COEFFICIENT ν [$m^2/s$] | $\rho^{0.45}/\sigma$ |
|---|---|---|---|---|
| A | 72.0 | 1001 | 9.99E−07 | 311 |
| B | 69.6 | 995 | 1.01E−06 | 321 |
| C | 22.4 | 789 | 1.52E−06 | 898 |
| D | 49.0 | 1020 | 2.45E−06 | 461 |
| E | 39.8 | 993 | 1.48E−06 | 560 |
| F | 62.6 | 993 | 9.85E−07 | 357 |
| G | 71.6 | 991 | 9.80E−07 | 311 |
| H | 70.7 | 990 | 9.78E−07 | 315 |
| I | 36.8 | 899 | 2.18E−05 | 580 |
| J | 30.4 | 925 | 2.89E−06 | 710 |
| K | 28.5 | 883 | 3.60E−06 | 743 |
| L | 28.4 | 884 | 3.70E−06 | 745 |

Therefore, based on the both formulas described above, there are derived the nozzle hole diameter D and the number of the nozzle holes 13 for spraying the liquids 3 $\rho^{0.45}/\sigma$ of which is in the range of $300<\rho^{0.45}/\sigma<900$, and which are different in kinematic viscosity coefficient ν from each other in a condition of fulfilling that the Reynolds number Re is no higher than 2300 and the jet number Je is no lower than 0.1 and no higher than 400, and thus, the aperture area S [$m^2$] necessary for the spray unit 2 is obtained. When the aperture area S necessary to realize the stable spray is decided, it is possible to freely combine the nozzle hole diameter D and the number of the nozzle holes 13 which fulfill the aperture area S with each other to set the combination, and thus, it is possible to easily realize the droplet jet device 25 capable of generating the homogenous droplets 7. It should be noted that the "aperture area" means the aperture area of the nozzle hole 13 when the number of the nozzle holes 13 is one, but means a total aperture area as a sum of the aperture areas of all of the nozzle holes 13 in a configuration having the plurality of nozzle holes 13.

Figure 2:
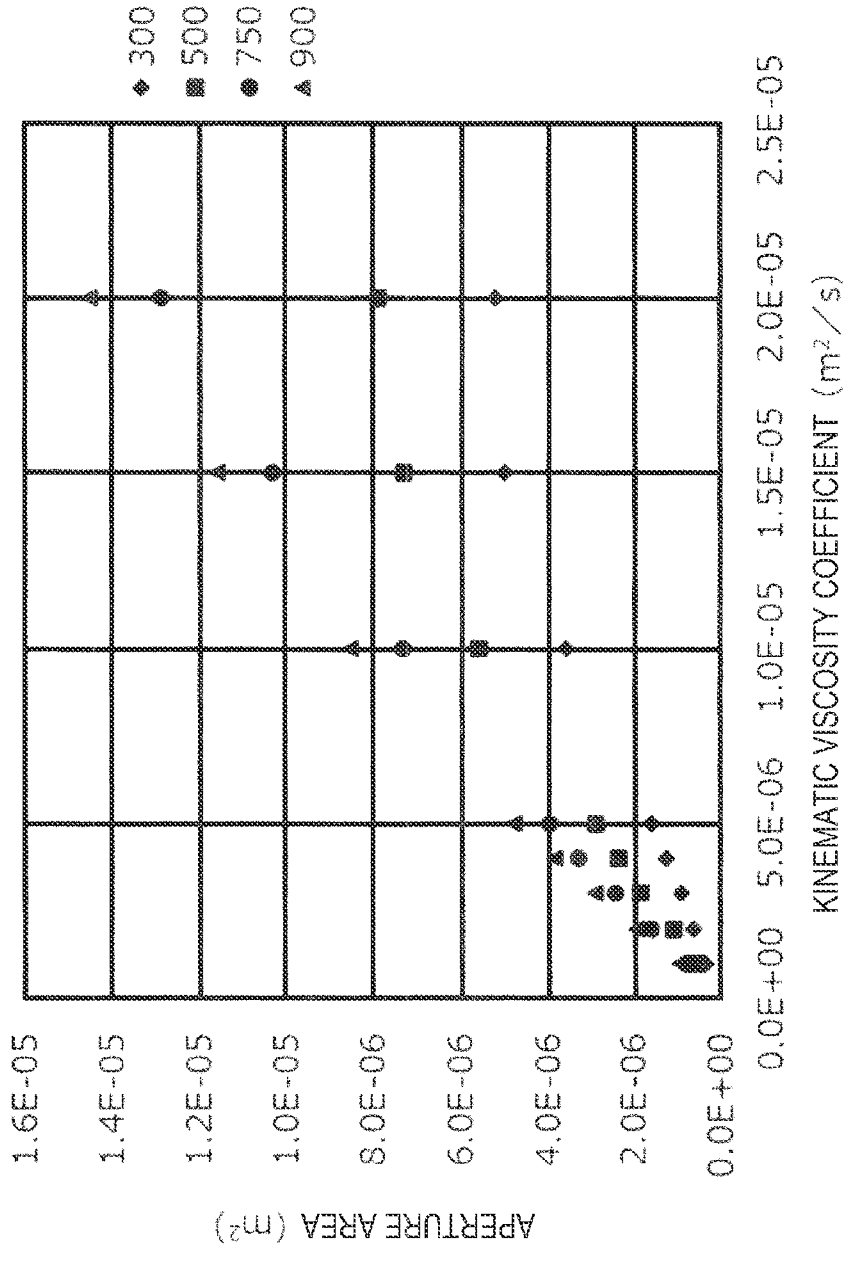
FIG. 2 is a graph with a vertical axis representing the aperture area, and a horizontal axis representing a kinematic viscosity coefficient.

Further, when the nozzle hole diameter D and the number of the nozzle holes 13 of the spray unit 2 are specified in advance, it is possible to identify a range of the physical property value of the liquid 3 which can be handled based on the aperture area S of the spray unit 2, and then appropriately select the liquid 3 to be used in the droplet jet device 25. Table 2 described below shows the aperture area S required for the kinematic viscosity coefficient ν of the liquids 3 having the physical property of $\rho^{0.45}/\sigma$ taking values of 300, 500, 750, and 900, respectively, when the jet flow rate is 10 [L/min]. It should be noted that FIG. 2 shows Table 2 as a graph.

TABLE 2

| | $\rho^{0.45}/\sigma$ | | | |
|---|---|---|---|---|
| | 300 | 500 | 750 | 900 |
| ν ($m^2/s$) | APERTURE AREA ($m^2$) | | | |
| 2.0.E−05 | 5.19E−06 | 7.84E−06 | 1.28E−05 | 1.45E−05 |
| 1.5.E−05 | 5.00E−06 | 7.26E−06 | 1.03E−05 | 1.16E−05 |
| 1.0.E−05 | 3.58E−06 | 5.59E−06 | 7.31E−06 | 8.49E−06 |
| 5.0.E−06 | 1.60E−06 | 2.86E−06 | 3.95E−06 | 4.79E−06 |
| 4.0.E−06 | 1.27E−06 | 2.36E−06 | 3.28E−06 | 3.84E−06 |
| 3.0.E−06 | 9.26E−07 | 1.84E−06 | 2.42E−06 | 2.91E−06 |
| 2.0.E−06 | 6.52E−07 | 1.09E−06 | 1.60E−06 | 1.96E−06 |
| 1.0.E−06 | 3.62E−07 | 5.80E−07 | 7.97E−07 | 9.48E−07 |

A relationship between the kinematic viscosity coefficient ν and the aperture area S can be expressed as approximation formulas of Formula (3) through Formula (6) described below which are good in correlation (correlation coefficient $R^2$). Therefore, as long as the kinematic viscosity coefficient ν and $\rho^{0.45}/\sigma$ are within predetermined ranges, it is possible to determine the aperture area S necessary for any liquids 3 from Formula (3) through Formula (6) or by interpolating these formulas.

$$S_{900} = -13565\nu^2 + 0.9908\nu \tag{3}$$

$(R^2=0.999)$ $$S_{750} = -9542.2\nu^2 + 0.8318\nu \tag{4}$$

$(R^2=1.000)$ $$S_{500} = -14002\nu^2 + 0.6797\nu \tag{5}$$

$(R^2=0.996)$ $$S_{300} = -6585.9\nu^2 + 0.4041\nu \tag{6}$$

$(R^2=0.983)$

From Formula (3) described above, it can be said that it is possible to spray the liquid 3 in the state of the preferable droplets 7 by setting the aperture area S so as to fulfill $S>-13565\nu^2+0.9908\nu$ in the liquid 3 having the physical property of $\rho^{0.45}/\sigma$ taking 900. Further, from Formula (4), it can be said that it is possible to spray the liquid 3 in the state of the preferable droplets 7 by setting the aperture area S so as to fulfill $S>-9542.2\nu^2+0.8318\nu$ in the liquid 3 having the physical property of $\rho^{0.45}/\sigma$ taking 750. Further, from Formula (5), it can be said that it is possible to spray the liquid 3 in the state of the preferable droplets 7 by setting the aperture area S so as to fulfill $S>-14002\nu^2+0.6797\nu$ in the liquid 3 having the physical property of $\rho^{0.45}/\sigma$ taking 500. Further, from Formula (6), it can be said that it is possible to spray the liquid 3 in the state of the preferable droplets 7 by setting the aperture area S so as to fulfill $S>-6585.9\nu^2+0.4041\nu$ in the liquid 3 having the physical property of $\rho^{0.45}/\sigma$ taking 300. In other words, it can be said that in a variety of general liquids 3 having the physical property of $\rho^{0.45}/\sigma$ no lower than 300 and no higher than 900, by setting the aperture area S so as to fulfill $S>-13565\nu^2+0.9908\nu$ which corresponds to the liquid 3 having the physical property of $\rho^{0.45}/\sigma$ taking 900, the jet flow of the liquid 3 sprayed from the nozzle hole 13 is fragmented into the droplets 7 in the smooth flow region or the wavy flow region, and thus, it is possible to spray the liquid 3 in the state of the preferable droplets 7.

Wrapping it up here for now, the droplet jet device 25 is provided with the flow channel 10 through which the liquid 3 flows, and the nozzle hole 13 for spraying the liquid 3, and as the method of determining the aperture area, it is possible to adopt using a liquid in which the value of $\rho^{0.45}/\sigma$ determined from the density ρ [kg/m$^3$] of the liquid 3 and the surface tension σ [N/m] of the liquid 3 is in the range no lower than 300 and no higher than 900, and the kinematic viscosity coefficient ν [m$^2$/s] of the liquid 3 is in the range no lower than 1.0E-6 and no higher than 2.0E-5 as the liquid 3, and setting the aperture area S [m$^2$] of the nozzle hole 13 so that the jet flow of the liquid 3 sprayed from the nozzle hole 13 is fragmented into the droplets 7 in such a droplet jet device 25 as described above.

In the method of determining the aperture area described above, there is used the liquid 3 in which the value of $\rho^{0.45}/\sigma$ determined from the density ρ [kg/m$^3$] of the liquid 3 and the surface tension σ [N/m] of the liquid 3 is in the range no lower than 300 and no higher than 900, and the kinematic viscosity coefficient ν [m$^2$/s] of the liquid 3 is in the range no lower than 1.0E-6 and no higher than 2.0E-5, and the aperture area S [m$^2$] of the nozzle hole 13 is determined so that the jet flow of the liquid 3 sprayed from the nozzle hole 13 is fragmented into the droplets 7. In other words, the aperture area S is determined taking the fact that the jet flow of the liquid 3 sprayed from the nozzle hole 13 is fragmented into the droplets 7 as an indispensable condition. Therefore, by executing the method of determining the aperture area described above, it is possible to fragment the jet flow into the droplets 7 to spray the liquid 3 in the state of the preferable droplets 7.

Here, in the droplet jet device 25, it is preferable to set the Reynolds number Re of the continuous flow 5 of the liquid 3 when flowing through the nozzle hole 13 no higher than 2300, and set the jet number Je of the liquid 3 to be sprayed from the nozzle hole 13 no lower than 0.1 and no higher than 400. Although it is preferable for the continuous flow 5 of the liquid 3 when flowing through the nozzle hole 13 to be a laminar flow, a tendency that the continuous flow 5 becomes a turbulent flow instead of the laminar flow increases when the Reynolds number Re exceeds 2300. Further, although it is preferable for the droplets 7 to be jetted in the smooth flow region or the wavy flow region, when the jet number Je is lower than 0.1, a tendency that the droplets 7 become in the dropping region instead of the smooth flow region or the wavy flow region increases, and when the jet number Je exceeds 400, a tendency that the droplets 7 become in the spray flow region instead of the smooth flow region or the wavy flow region increases. However, by making the Reynolds number Re of the continuous flow 5 of the liquid 3 when flowing through the nozzle hole 13 no higher than 2300, and making the jet number Je of the liquid 3 sprayed from the nozzle hole 13 no lower than 0.1 and no higher than 400, it is possible to realize the laminar flow as the continuous flow 5 of the liquid 3 when flowing through the nozzle hole 13, and at the same time, jet the droplets 7 in the smooth flow region or the wavy flow region. Therefore, it is possible to spray the liquid 3 in the state of the particularly preferable droplets 7.

Further, when the droplet jet device 25 perform the spray at Q [L/min] as the jet flow rate when spraying the liquid 3 as described above, it is preferable to fulfill $S>(-1356.5\nu^2+0.09908\nu)\times Q$. This is because it is possible to spray the liquid 3 in the state of the particularly preferable droplets 7 by determining the aperture area S so as to fulfill $S>(-1356.5\nu^2+0.09908\nu)\times Q$ when spraying the liquid at Q [L/min].

Here, when presenting the description from a viewpoint of the droplet jet device, the droplet jet device 25 is provided with the flow channel 10 through which the liquid 3 flows, and the nozzle hole 13 for spraying the liquid 3. Here, as the liquid 3, there is used a liquid having the value of $\rho^{0.45}/\sigma$ determined from the density ρ [kg/m$^3$] of the liquid 3 and the surface tension σ [N/m] of the liquid 3 in the range no lower than 300 and no higher than 900, and having the kinematic viscosity coefficient ν [m$^2$/s] of the liquid 3 in the range no lower than 1.0E-6 and no higher than 2.0E-5. Further, when the droplet jet device 25 perform the spray at Q [L/min] as the jet flow rate when spraying the liquid 3, there is adopted the configuration in which the aperture area S [m$^2$] of the nozzle hole 13 fulfills $S>(-1356.5\nu^2+0.09908\nu)\times Q$. As described above, it is possible to spray the liquid 3 in the state of the particularly preferable droplets 7 by adopting the aperture area S determined so as to fulfill $S>(-1356.5\nu^2+0.09908\nu)\times Q$ when spraying the liquid 3 at Q [L/min].

Further, as described above, by making the Reynolds number Re of the continuous flow 5 of the liquid 3 when flowing through the nozzle hole 13 no higher than 2300, and making the jet number Je of the liquid 3 sprayed from the nozzle hole 13 no lower than 0.1 and no higher than 400, it is possible for the droplet jet device 25 to realize the laminar flow as the continuous flow 5 of the liquid 3 when flowing through the nozzle hole 13, and at the same time, jet the droplets 7 in the smooth flow region or the wavy flow region. Therefore, by adopting such a configuration, it is possible to spray the liquid 3 in the state of the particularly preferable droplets 7.

Figure 3:
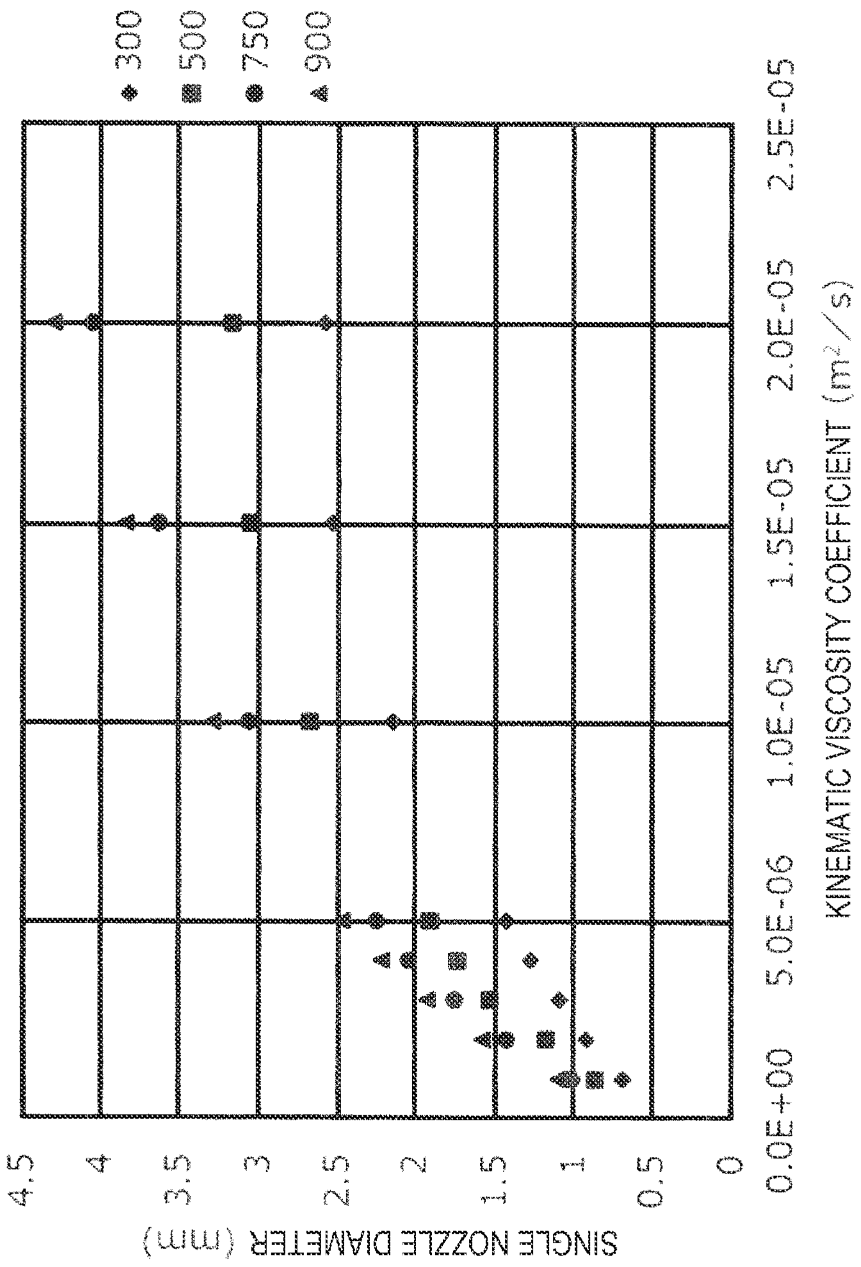
FIG. 3 is a graph with a vertical axis representing a single nozzle diameter, and a horizontal axis representing the kinematic viscosity coefficient.

Further, Table 3 shows a relationship between the single nozzle diameter and the kinematic viscosity coefficient ν required when fulfilling the aperture area S with the single nozzle hole 13 from the aperture area S obtained in such a manner as described above. Further, FIG. 3 shows Table 3 as a graph.

TABLE 3

| | $\rho^{0.45}/\sigma$ | | | |
|---|---|---|---|---|
| | 300 | 500 | 750 | 900 |
| ν (m$^2$/s) | SINGLE NOZZLE DIAMETER (mm) | | | |
| 2.0.E−05 | 2.57 | 3.16 | 4.04 | 4.30 |
| 1.5.E−05 | 2.52 | 3.04 | 3.62 | 3.84 |

TABLE 3-continued

| | $\rho^{0.45}/\sigma$ | | | |
|---|---|---|---|---|
| | 300 | 500 | 750 | 900 |
| v ($m^2$/s) | SINGLE NOZZLE DIAMETER (mm) | | | |
| 1.0.E−05 | 2.14 | 2.67 | 3.05 | 3.29 |
| 5.0.E−06 | 1.43 | 1.91 | 2.24 | 2.47 |
| 4.0.E−06 | 1.27 | 1.73 | 2.04 | 2.21 |
| 3.0.E−06 | 1.09 | 1.53 | 1.75 | 1.92 |
| 2.0.E−06 | 0.91 | 1.18 | 1.43 | 1.58 |
| 1.0.E−06 | 0.68 | 0.86 | 1.01 | 1.10 |

Also in the relationship between the single nozzle diameter and the kinematic viscosity coefficient ν shown in FIG. 3 and Table 3, there is obtained a good correlation similarly to the relationship between the aperture area S and the kinematic viscosity coefficient ν. In other words, as long as the liquid 3 has the kinematic viscosity coefficient ν and $\rho^{0.45}/\sigma$ in the predetermined ranges, by setting the diameter larger than the single nozzle diameter obtained by FIG. 3 and Table 3, it is possible to realize the spray with the stable laminar flow and formation of the droplets.

Hereinafter, Table 4 through Table 13 show relationships between the kinematic viscosity coefficient ν of the liquid 3 having the physical property of $\rho^{0.45}/\sigma$ taking 300, 500, 750, and 900, and the necessary aperture area S and the single nozzle diameter when setting the jet flow rate to 100 [ml/min], 50 [ml/min], 10 [ml/min], 5 [ml/min], and 1 [ml/min]. Here, Table 4 shows the aperture area S when the jet flow rate is 100 [ml/min], and Table 5 shows the single nozzle diameter when the jet flow rate is 100 [ml/min]. Further, Table 6 shows the aperture area S when the jet flow rate is 50 [ml/min], and Table 7 shows the single nozzle diameter when the jet flow rate is 50 [ml/min]. Further, Table 8 shows the aperture area S when the jet flow rate is 10 [ml/min], and Table 9 shows the single nozzle diameter when the jet flow rate is 10 [ml/min]. Further, Table 10 shows the aperture area S when the jet flow rate is 5 [ml/min], and Table 11 shows the single nozzle diameter when the jet flow rate is 5 [ml/min]. Further, Table 12 shows the aperture area S when the jet flow rate is 1 [ml/min], and Table 13 shows the single nozzle diameter when the jet flow rate is 1 [ml/min]. When the aperture area S is changed at the same change rate as a change rate of the jet flow rate, it is possible to make the Reynolds number Re and the jet number Je fall within predetermined ranges, respectively. The single nozzle diameter can be set in a range from a maximum value of 0.43 mm corresponding to when the jet flow rate of 100 [ml/min], $\rho^{0.45}/\sigma=900$, and $\nu=2.0E\text{-}05$ [$m^2$/s] are set to a minimum value of 0.007 mm corresponding to when the jet flow rate of 1 [ml/min], $\rho^{0.45}/\sigma=300$, and $\nu=1.0E\text{-}06$ [$m^2$/s] are set, and by appropriately selecting the nozzle diameter in accordance with the physical property of the liquid to be sprayed, it is possible to configure the droplet jet device 25 equipped with the spray unit 2 making it possible to spray the laminar flow as the stable continuous flow and to generate the homogenous droplets.

TABLE 4

| | $\rho^{0.45}/\sigma$ | | | |
|---|---|---|---|---|
| | 300 | 500 | 750 | 900 |
| v ($m^2$/s) | APERTURE AREA ($m^2$) | | | |
| 2.0.E−05 | 5.19E−08 | 7.84E−08 | 1.28E−07 | 1.45E−07 |
| 1.5.E−05 | 5.00E−08 | 7.26E−08 | 1.03E−07 | 1.16E−07 |

TABLE 4-continued

| | $\rho^{0.45}/\sigma$ | | | |
|---|---|---|---|---|
| | 300 | 500 | 750 | 900 |
| v ($m^2$/s) | APERTURE AREA ($m^2$) | | | |
| 1.0.E−05 | 3.58E−08 | 5.59E−08 | 7.31E−08 | 8.49E−08 |
| 5.0.E−06 | 1.60E−08 | 2.86E−08 | 3.95E−08 | 4.79E−08 |
| 4.0.E−06 | 1.27E−08 | 2.36E−08 | 3.28E−08 | 3.84E−08 |
| 3.0.E−06 | 9.26E−09 | 1.84E−08 | 2.42E−08 | 2.91E−08 |
| 2.0.E−06 | 6.52E−09 | 1.09E−08 | 1.60E−08 | 1.96E−08 |
| 1.0.E−06 | 3.62E−09 | 5.80E−09 | 7.97E−09 | 9.48E−09 |

TABLE 5

| | $\rho^{0.45}/\sigma$ | | | |
|---|---|---|---|---|
| | 300 | 500 | 750 | 900 |
| v ($m^2$/s) | SINGLE NOZZLE DIAMETER (mm) | | | |
| 2.0.E−05 | 0.257 | 0.316 | 0.404 | 0.430 |
| 1.5.E−05 | 0.252 | 0.304 | 0.362 | 0.384 |
| 1.0.E−05 | 0.214 | 0.267 | 0.305 | 0.329 |
| 5.0.E−06 | 0.143 | 0.191 | 0.224 | 0.247 |
| 4.0.E−06 | 0.127 | 0.173 | 0.204 | 0.221 |
| 3.0.E−06 | 0.109 | 0.153 | 0.175 | 0.192 |
| 2.0.E−06 | 0.091 | 0.118 | 0.143 | 0.158 |
| 1.0.E−06 | 0.068 | 0.086 | 0.101 | 0.110 |

TABLE 6

| | $\rho^{0.45}/\sigma$ | | | |
|---|---|---|---|---|
| | 300 | 500 | 750 | 900 |
| v ($m^2$/s) | APERTURE AREA ($m^2$) | | | |
| 2.0.E−05 | 2.60E−08 | 3.92E−08 | 6.42E−08 | 7.26E−08 |
| 1.5.E−05 | 2.50E−08 | 3.63E−08 | 5.15E−08 | 5.79E−08 |
| 1.0.E−05 | 1.79E−08 | 2.79E−08 | 3.66E−08 | 4.25E−08 |
| 5.0.E−06 | 7.98E−09 | 1.43E−08 | 1.98E−08 | 2.39E−08 |
| 4.0.E−06 | 6.37E−09 | 1.18E−08 | 1.64E−08 | 1.92E−08 |
| 3.0.E−06 | 4.63E−09 | 9.19E−09 | 1.21E−08 | 1.45E−08 |
| 2.0.E−06 | 3.26E−09 | 5.44E−09 | 7.98E−09 | 9.79E−09 |
| 1.0.E−06 | 1.81E−09 | 2.90E−09 | 3.99E−09 | 4.74E−09 |

TABLE 7

| | $\rho^{0.45}/\sigma$ | | | |
|---|---|---|---|---|
| | 300 | 500 | 750 | 900 |
| v ($m^2$/s) | SINGLE NOZZLE DIAMETER (mm) | | | |
| 2.0.E−05 | 0.182 | 0.223 | 0.286 | 0.304 |
| 1.5.E−05 | 0.178 | 0.215 | 0.256 | 0.272 |
| 1.0.E−05 | 0.151 | 0.189 | 0.216 | 0.233 |
| 5.0.E−06 | 0.101 | 0.135 | 0.159 | 0.175 |
| 4.0.E−06 | 0.090 | 0.123 | 0.145 | 0.156 |
| 3.0.E−06 | 0.077 | 0.108 | 0.124 | 0.136 |
| 2.0.E−06 | 0.064 | 0.083 | 0.101 | 0.112 |
| 1.0.E−06 | 0.048 | 0.061 | 0.071 | 0.078 |

TABLE 8

| | $\rho^{0.45}/\sigma$ | | | |
|---|---|---|---|---|
| | 300 | 500 | 750 | 900 |
| v ($m^2$/s) | APERTURE AREA ($m^2$) | | | |
| 2.0.E−05 | 5.19E−09 | 7.84E−09 | 1.28E−08 | 1.45E−08 |
| 1.5.E−05 | 5.00E−09 | 7.26E−09 | 1.03E−08 | 1.16E−08 |
| 1.0.E−05 | 3.58E−09 | 5.59E−09 | 7.31E−09 | 8.49E−09 |
| 5.0.E−06 | 1.60E−09 | 2.86E−09 | 3.95E−09 | 4.79E−09 |

TABLE 8-continued

| | $\rho^{0.45}/\sigma$ | | | |
|---|---|---|---|---|
| | 300 | 500 | 750 | 900 |
| v ($m^2$/s) | APERTURE AREA ($m^2$) | | | |
| 4.0.E−06 | 1.27E−09 | 2.36E−09 | 3.28E−09 | 3.84E−09 |
| 3.0.E−06 | 9.26E−10 | 1.84E−09 | 2.42E−09 | 2.91E−09 |
| 2.0.E−06 | 6.52E−10 | 1.09E−09 | 1.60E−09 | 1.96E−09 |
| 1.0.E−06 | 3.62E−10 | 5.80E−10 | 7.97E−10 | 9.48E−10 |

TABLE 9

| | $\rho^{0.45}/\sigma$ | | | |
|---|---|---|---|---|
| | 300 | 500 | 750 | 900 |
| v ($m^2$/s) | SINGLE NOZZLE DIAMETER (mm) | | | |
| 2.0.E−05 | 0.081 | 0.100 | 0.128 | 0.136 |
| 1.5.E−05 | 0.080 | 0.096 | 0.114 | 0.121 |
| 1.0.E−05 | 0.068 | 0.084 | 0.096 | 0.104 |
| 5.0.E−06 | 0.045 | 0.060 | 0.071 | 0.078 |
| 4.0.E−06 | 0.040 | 0.055 | 0.065 | 0.070 |
| 3.0.E−06 | 0.034 | 0.048 | 0.055 | 0.061 |
| 2.0.E−06 | 0.029 | 0.037 | 0.045 | 0.050 |
| 1.0.E−06 | 0.021 | 0.027 | 0.032 | 0.035 |

TABLE 10

| | $\rho^{0.45}/\sigma$ | | | |
|---|---|---|---|---|
| | 300 | 500 | 750 | 900 |
| v ($m^2$/s) | APERTURE AREA ($m^2$) | | | |
| 2.0.E−05 | 2.60E−09 | 3.92E−09 | 6.42E−09 | 7.26E−09 |
| 1.5.E−05 | 2.50E−09 | 3.63E−09 | 5.15E−09 | 5.79E−09 |
| 1.0.E−05 | 1.79E−09 | 2.79E−09 | 3.66E−09 | 4.25E−09 |
| 5.0.E−06 | 7.98E−10 | 1.43E−09 | 1.98E−09 | 2.39E−09 |
| 4.0.E−06 | 6.37E−10 | 1.18E−09 | 1.64E−09 | 1.92E−09 |
| 3.0.E−06 | 4.63E−10 | 9.19E−10 | 1.21E−09 | 1.45E−09 |
| 2.0.E−06 | 3.26E−10 | 5.44E−10 | 7.98E−10 | 9.79E−10 |
| 1.0.E−06 | 1.81E−10 | 2.90E−10 | 3.99E−10 | 4.74E−10 |

TABLE 11

| | $\rho^{0.45}/\sigma$ | | | |
|---|---|---|---|---|
| | 300 | 500 | 750 | 900 |
| v ($m^2$/s) | SINGLE NOZZLE DIAMETER (mm) | | | |
| 2.0.E−05 | 0.058 | 0.071 | 0.090 | 0.096 |
| 1.5.E−05 | 0.056 | 0.068 | 0.081 | 0.086 |
| 1.0.E−05 | 0.048 | 0.060 | 0.068 | 0.074 |
| 5.0.E−06 | 0.032 | 0.043 | 0.050 | 0.055 |
| 4.0.E−06 | 0.028 | 0.039 | 0.046 | 0.049 |
| 3.0.E−06 | 0.024 | 0.034 | 0.039 | 0.043 |
| 2.0.E−06 | 0.020 | 0.026 | 0.032 | 0.035 |
| 1.0.E−06 | 0.015 | 0.019 | 0.023 | 0.025 |

TABLE 12

| | $\rho^{0.45}/\sigma$ | | | |
|---|---|---|---|---|
| | 300 | 500 | 750 | 900 |
| v ($m^2$/s) | APERTURE AREA ($m^2$) | | | |
| 2.0.E−05 | 5.19E−10 | 7.84E−10 | 1.28E−09 | 1.45E−09 |
| 1.5.E−05 | 5.00E−10 | 7.266−10 | 1.03E−09 | 1.16E−09 |
| 1.0.E−05 | 3.58E−10 | 5.59E−10 | 7.31E−10 | 8.49E−10 |
| 5.0.E−06 | 1.60E−10 | 2.86E−10 | 3.95E−10 | 4.79E−10 |
| 4.0.E−06 | 1.27E−10 | 2.36E−10 | 3.28E−10 | 3.84E−10 |
| 3.0.E−06 | 9.266−11 | 1.84E−10 | 2.42E−10 | 2.91E−10 |

TABLE 12-continued

| | $\rho^{0.45}/\sigma$ | | | |
|---|---|---|---|---|
| | 300 | 500 | 750 | 900 |
| v ($m^2$/s) | APERTURE AREA ($m^2$) | | | |
| 2.0.E−06 | 6.52E−11 | 1.09E−10 | 1.60E−10 | 1.96E−10 |
| 1.0.E−06 | 3.62E−11 | 5.80E−11 | 7.97E−11 | 9.48E−11 |

TABLE 13

| | $\rho^{0.45}/\sigma$ | | | |
|---|---|---|---|---|
| | 300 | 500 | 750 | 900 |
| v ($m^2$/s) | SINGLE NOZZLE DIAMETER (mm) | | | |
| 2.0.E−05 | 0.026 | 0.032 | 0.040 | 0.043 |
| 1.5.E−05 | 0.025 | 0.030 | 0.036 | 0.038 |
| 1.0.E−05 | 0.021 | 0.027 | 0.031 | 0.033 |
| 5.0.E−06 | 0.014 | 0.019 | 0.022 | 0.025 |
| 4.0.E−06 | 0.013 | 0.017 | 0.020 | 0.022 |
| 3.0.E−06 | 0.011 | 0.015 | 0.018 | 0.019 |
| 2.0.E−06 | 0.009 | 0.012 | 0.014 | 0.016 |
| 1.0.E−06 | 0.007 | 0.009 | 0.010 | 0.011 |

Figure 4:
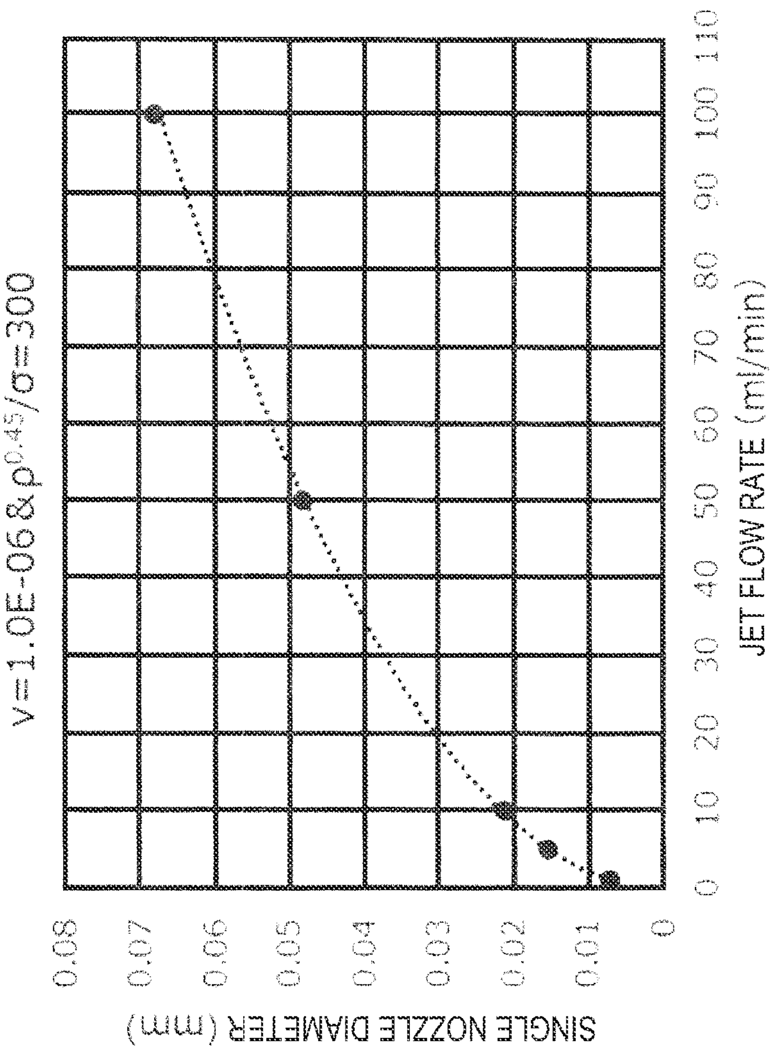
FIG. 4 is a graph showing a relationship between a jet flow rate and the single nozzle diameter.

Here, when the liquid 3 the physical property of which is known is actually sprayed, measured values of the single nozzle diameter and the jet flow rate with which the stable laminar flow spray and the droplet generation can be realized, and calculated value of the single nozzle diameter based on the above are compared to each other. Table 14 shows a result of the calculation of the single nozzle diameter which is necessary from the relationship described above with respect to the flow rate at which the water at 20° C. can be sprayed at a plurality of levels of the single nozzle diameter from the 0.01 mm to 0.12 mm. Here, since the kinematic viscosity coefficient ν of the water is about 1.0E-06 [$m^2$/s] and $\rho^{0.45}/\sigma$ thereof is about 300, the relationship between the jet flow rate (the flow rate) and the single nozzle diameter in the corresponding physical property described in Table 3 through Table 13 is defined by an approximation formula (the single nozzle diameter=$0.0069\nu^{0.4948}$) based on FIG. 4 corresponding to when $\rho^{0.45}/\sigma$=300 and ν=1.0E-06 [$m^2$/s] are set, and the calculated values of the single nozzle diameter are obtained as shown in Table 14. Since any of the measured values of the single nozzle diameter are sufficiently larger than the calculated values of the single nozzle diameter thus calculated, it is understood that the stable spray can be realized.

TABLE 14

| SINGLE NOZZLE DIAMETER IN MEASURED VALUE (mm) | FLOW RATE (ml/min) | SINGLE NOZZLE DIAMETER IN CALCULATED VALUE (mm) |
|---|---|---|
| 0.01 | 0.9 | 0.002 |
| 0.016 | 4.8 | 0.006 |
| 0.03 | 5.5 | 0.016 |
| 0.024 | 10 | 0.008 |
| 0.08 | 40 | 0.043 |
| 0.12 | 100 | 0.068 |

Regarding the liquid the kinematic viscosity coefficient ν of which is about 2E-06 [$m^2$/s], and $\rho^{0.45}/\sigma$ of which is about 900, which is relatively low in viscosity, and the surface tension σ of which is extremely low, the relationship between the flow rate and the single nozzle diameter in the corresponding physical property described in Table 3 through Table 13 is defined by an approximation formula (the single nozzle diameter=$0.0158\nu^{0.5}$), and the calculated values of the single nozzle diameter with respect to the jet flow rate which can be sprayed with the measured values 0.01 mm, 0.016 mm, and 0.024 mm of the nozzle diameter are calculated. As a result, when the measured value of the nozzle diameter is 0.01 mm, the calculated value of the single nozzle diameter is 0.005 mm, when the measured value of the nozzle diameter is 0.016 mm, the calculated value of the single nozzle diameter is 0.005 mm, and when the measured value of the nozzle diameter is 0.024 mm, the calculated value of the single nozzle diameter is 0.018 mm. As described above, since any of the measured values of the nozzle diameter are larger than the calculated values of the single nozzle diameter, it is understood that the stable spray can be realized.

It should be noted that there has been confirmed whether or not the liquids 3 can be sprayed in the state of the preferable droplets 7 using a variety of liquids 3 using the droplet jet device 25 having the aperture area S and the single nozzle diameter determined in such a manner as described above. As a result, it has been confirmed that it is possible to spray these liquids 3 in the state of the preferable droplets 7 when using any of these liquids 3.

What is claimed is:

1. A method of operating a droplet jet device provided with a nozzle hole configured to spray a liquid and a flow channel through which the liquid flows, the method comprising:

preparing the liquid, the liquid having:

$\rho^{0.45}/\sigma$ being in a range of 300 to 900, wherein the $\rho$ [kg/m$^3$] is a density of the liquid, and the $\sigma$ [N/m] is a surface tension of the liquid; and $\nu$ being in a range of 1.0E-6 and 2.0E-5, wherein the $\nu$ [m$^2$/s] is a kinematic viscosity coefficient of the liquid;

adjusting a size of an aperture area S [m$^2$] of the nozzle hole such that a jet flow of the liquid sprayed from the nozzle hole is fragmented into droplets, the aperture area having:

$S>(-1356.5\nu^2+0.09908\nu)\times Q$, wherein the Q [L/min] is a jet flow rate of the jet flow of the liquid from the nozzle hole;

adjusting a nozzle diameter D [m] of the nozzle hole within a range of 7.00E-06 and 4.30E-03; and applying the droplets of the liquid to a part of a living body to clean the part of the living body by the liquid.

2. The method according to claim 1, wherein the size of the aperture area S [m$^2$] of the nozzle hole is adjusted such that a Reynolds number Re of a continuous flow of the liquid flowing through the nozzle hole is set no higher than 2300, and a jet number Je of the liquid to be sprayed from the nozzle hole is set no lower than 0.1 and no higher than 400, the Je number is defined as a following formula:

$$Je=\frac{\rho DV^2}{\sigma}\cdot\left(\frac{\rho_a}{\rho}\right)^{0.55}=\rho_a^{0.55}\cdot\frac{\rho^{0.45}}{\sigma}\cdot DV^2,$$

wherein the V [m/s] is a flow velocity of the liquid, and the $\rho a$ [kg/m$^3$] is a density of air, and $\rho a^{0.55}$ has a constant value of approximately 1.1.

* * * * *